(12) United States Patent
Okada (10) Patent No.: US 7,665,748 B2
(45) Date of Patent: Feb. 23, 2010

(54) DRIVING MODE SWITCHING APPARATUS AND CONTROL METHOD THEREFOR

(75) Inventor: Tokuji Okada, Niigata (JP)

(73) Assignee: Niigata University, Niigata (JP)

(*) Notice: Subject to any disclaimer, the term of this patent is extended or adjusted under 35 U.S.C. 154(b) by 454 days.

(21) Appl. No.: 11/569,859

(22) PCT Filed: Dec. 20, 2005

(86) PCT No.: PCT/JP2005/023395

§ 371 (c)(1),
(2), (4) Date: Nov. 30, 2006

(87) PCT Pub. No.: WO2006/095487

PCT Pub. Date: Sep. 14, 2006

(65) Prior Publication Data

US 2008/0290622 A1 Nov. 27, 2008

(30) Foreign Application Priority Data

Mar. 10, 2005 (JP) ............................ 2005-067171

(51) Int. Cl.
*B62D 7/16* (2006.01)
(52) U.S. Cl. ................... 280/99; 280/91.1; 180/234
(58) Field of Classification Search ............. 280/98, 280/99, 91.1, 771; 180/234, 236, 241, 251, 180/245, 246, 408, 409; 74/470, 496
See application file for complete search history.

(56) References Cited

U.S. PATENT DOCUMENTS

| | | | | |
|---|---|---|---|---|
| 2,834,605 A | * | 5/1958 | McCollough | 180/410 |
| 3,669,466 A | | 6/1972 | Spence et al. | |
| 4,257,619 A | * | 3/1981 | Fisher | 180/411 |
| 4,852,679 A | * | 8/1989 | Fry | 180/234 |
| 4,957,183 A | * | 9/1990 | Mullett et al. | 180/234 |

(Continued)

FOREIGN PATENT DOCUMENTS

JP 31-1062 B1 2/1956

(Continued)

OTHER PUBLICATIONS

Makoto Ichikawa, Wheel Arrangement for Wheeled Vehicle, Academic Journal of Robotics Society of Japan, vol. 13, No. 1, pp. 107-112, 1995.

*Primary Examiner*—Paul N Dickson
*Assistant Examiner*—Drew Brown
(74) *Attorney, Agent, or Firm*—Darby & Darby PC (57) ABSTRACT

A driving form switching apparatus enabling even a user of wheelchair who cannot freely use limb to easily change over a driving form by single hand self-operation. By using a differential gear mechanism or a combination mechanism comprising pinions and racks, the rotating, tilting and shifting motions of a steering lever are transmitted to two rotating shafts. Drums are directly coupled to the two rotating shafts, and the rotations of the two rotating shafts are transmitted to steering shafts through flexible wires as first connecting means. Also, the steering shafts for wheels are parallel- or cross-connected by second connecting means. Thus, the driving forms of a four-wheel drive vehicle such as back and forth traveling, counter-clockwise turning, clockwise turning, turning on the spot, parallel traveling, stopping and braking, etc, can be switched by a single-hand simple operation.

6 Claims, 8 Drawing Sheets

U.S. PATENT DOCUMENTS 5,112,183 A * 5/1992 Nusbaum et al. ............ 414/544
5,752,578 A * 5/1998 Kellogg ...................... 180/414

FOREIGN PATENT DOCUMENTS

| JP | 49-118125 A | 11/1974 |
|---|---|---|
| JP | 50-1533 B1 | 1/1975 |
| JP | 62-120231 A | 6/1987 |
| JP | 62-125674 U | 8/1987 |
| JP | 3-26672 U | 3/1991 |
| JP | 3-178832 A | 8/1991 |
| JP | 07-291143 A | 11/1995 |
| JP | 08-272443 A | 10/1996 |
| JP | 09-109970 A | 4/1997 |
| JP | 2003-237608 A | 8/2003 |

* cited by examiner

DRIVING MODE SWITCHING APPARATUS AND CONTROL METHOD THEREFOR

This is a U.S. national phase application under 35 U.S.C. §371 of International Patent Application No. PCT/JP2005/023395 filed Dec. 20, 2005, and claims the benefit of Japanese Application No. 2005-067171 filed Mar. 10, 2005. The International Application was published in Japanese on Sep. 14, 2006 as International Publication No. WO 2006/095487 under PCT Article 21(2) the content of which is incorporated herein in its entirety.

TECHNICAL FIELD

The present invention relates to a driving form switching device and a control method therefor, enabling switching of various driving forms or modes of a four-wheel vehicle, such as back and forth traveling, counter-clockwise turning, clockwise turning, turning on the spot, parallel traveling, stopping and braking, etc, by a single-hand simple operation. Specifically, the present invention relates to a control technique for a control lever for determining a rotation angle of a steering shaft in a walking support vehicle for physically disabled persons or an electric wheelchair.

BACKGROUND ART

As long as a driving force is applied to wheels, a walking support vehicle takes a varying course depending on a steering angle of the vehicle. There are three steering systems in that case, i.e., front wheel steering, rear wheel steering and all (four)-wheel steering, which are used in accordance with the velocity of a traveling vehicle and/or the width of a road surface. For safe and effective traveling, front wheel steering may be used in high speed traveling, rear wheel steering in low speed driving, and all-wheel steering in a narrow road driving, respectively. All-wheel steering includes a steering for driving into the garage where the directions of front and rear wheels are turned in a reversed direction, and a steering for driving sideways where front and rear wheels are turned in the same direction, (hereinafter the former steering system is called "driving-into-the-garage steering", while the latter "driving-sideways steering", respectively). It is to be noted that most vehicles employ either one of the foregoing steering systems.

According to the existing techniques, no four-wheel vehicles enable turning on the spot, and thus the driving forms of most four-wheel vehicles are back and forth traveling and clockwise/counter-clockwise turnings only. Braking and stopping are realized by holding down a wheel drum or a rim to a disc or a shoe pad. As a means for controlling a steering angle, a manual and mechanical steering, or an electric servo operation using a joystick is available. Also available is a power steering operation that reduces a burden in using a manual power.

Some of conventional vehicles steer four wheels by driving a connecting wire by manual steering, in which steering forms are limited because the directions of the right and left wheels are always kept parallel to each other. Further, since the shaft of the rear wheel itself is rotated in such convention vehicles, the structure thereof becomes too complicated, as is shown in Patent Document 1. Besides, there is also disclosed a traveling vehicle of which the steering system is to direct the front and rear wheels in the same direction or a different direction, as is shown in Patent Document 2, proposing an attitude control based on proportion and integral control actions introduced into signals from a steering angle detector to produce steering directions, thereby driving a steering electric motor. Also, a steering device that controls a steering angle of all wheels delicately using a controller and an exclusive actuator such as a stepping motor or hydraulic cylinder is disclosed in a Patent Document 3. In a Non-Patent document 1, a steering system enabling the omni directional traveling is defined as an independent steering system.

Patent Document 1: Japanese Unexamined Patent Publication No. 09-109970
Patent Document 2: Japanese Unexamined Patent Publication No. 08-272443
Patent Document 3: Japanese Unexamined Patent Publication No. 07-291143
Non Patent Document 1: Makoto Ichikawa "Steering System and Drive Power Transmission in Wheel Shifting Mechanism" P107-112, Volume 13 No. 1 of Journal of RSJ (The Robotics Society of Japan) published in 1995.

SUMMARY OF THE INVENTION

In order to control the switching of various driving forms of a four-wheel vehicle including even turning on the spot and stopping and braking, not only steering operation but changeover switch operation and lever operation are normally necessary. For this reason, those operations need using both hands and/or support by footwork. However, even physically unimpaired persons are sometimes unable to use hands and feet. All those problems can be solved if various driving forms are switchable by a single-hand operation. Such method or means for supporting that technical goal is extremely useful for those having a part of their limbs paralyzed. For an electric four-wheeled moving vehicle used in a daily life car as well, such device makes a contribution to enhancing the convenience of an operator.

An object of the invention is to provide a method and means, enabling switching of various driving forms of a four-wheel vehicle, such as back and forth traveling, counter-clockwise turning, clockwise turning, turning on the spot, parallel traveling, stopping and braking, etc, by a single-hand operation.

The invention according to a first aspect of the invention is a driving form switching apparatus for switching driving forms of a four-wheel vehicle, said four wheels being axially independently provided, including two front wheels and two rear wheels, including: a steering device for steering a steering shaft of each wheel; a first connecting means for transmitting an output from said steering device to said steering shafts; a second connecting means connected so that said front wheels are rotated in cooperation with said rear wheels, respectively, wherein the driving forms of said four-wheel vehicle is capable of being switched by single-hand operation, by rotating or shifting a steering lever provided in said steering device.

Thus, the steering lever rotating motion or shifting motion is transmitted to the steering shafts of the front (or rear) wheels, and then further transmitted to the rear (front) wheels through the second connecting means, whereby the driving forms such as back and forth traveling, counter-clockwise turning, clockwise turning, turning on the spot, parallel traveling, stopping and braking, etc, can be switched by a single-hand operation only.

The invention according to a second aspect of the invention is a driving form switching apparatus for switching driving forms of a four-wheel vehicle, having: a steering device having a steering lever connected with a driving shaft of a differential gear mechanism so that rotating motion or swaying motion of said steering lever may be transmitted to two driven shafts; a first connecting means for transmitting the rotation of one of said two driven shafts that constitute said differential gear mechanism to the rotation of a steering shaft of a right-hand wheel, and the rotation of the other of said two driven shafts to the rotation of a steering shaft of a left-hand wheel so that said right-hand steering shaft is rotated in cooperation with said left-hand steering shaft; and a second connecting means connected so that the steering shafts of the right-hand front and rear wheels as well as the steering shafts of the left-hand front and rear wheels may be rotated in mutually reverse phases, respectively.

Thus, when the steering lever is operated to rotate the steering shafts of the right- and left-hand front wheels in the steering device including the differential gear mechanism, the right-hand front and rear wheels, as well as the left-hand front and rear wheels are each connected so as to rotate in mutually opposite phases, whereby the driving forms such as back and forth traveling, counter-clockwise turning, clockwise turning, turning on the spot, parallel traveling, stopping and braking, etc, can be freely switched by a single-hand operation only.

The invention according to a third aspect of the invention is a driving form switching apparatus for switching driving forms of a four-wheel vehicle, including: a steering device having a steering lever connected with a driving shaft of a differential gear mechanism so that rotating motion or swaying motion of said steering lever may be transmitted to two driven shafts; a first connecting means for transmitting the rotation of one of said two driven shafts that constitute said differential gear mechanism to the rotation of a steering shaft of a right-hand wheel, and the rotation of the other of said two driven shafts to the rotation of a steering shaft of a left-hand wheel so that said right-hand steering shaft is rotated in cooperation with the said left-hand steering shaft; and a second connecting means connected so that the steering shafts of the right-hand front wheel and the left-hand rear wheel may be rotated in the same phase, and the steering shafts of the left-hand front wheel and the right-hand rear wheel may be rotated in the same phase.

Thus, when the steering lever is operated to rotate the steering shafts of the right- and left-hand front wheels in the steering device including the differential gear mechanism, the right-hand front wheel and the left-hand rear wheel, as well as the left-hand front wheel and the right-hand rear wheel are each connected so as to rotate in the same phases, whereby the driving forms such as back and forth traveling, leftward parallel traveling, rightward parallel traveling, turning on the spot, stopping and braking, etc, can be freely switched by a single-hand operation only.

The invention according to a fourth aspect of the invention is a driving form switching apparatus for switching driving forms of a four-wheel vehicle, having: a steering device including a steering lever and a pinion/rack mechanism having two pinions so that rotating motion or shifting motion of said steering lever may be transmitted to said pinion/rack mechanism; a first connecting means for transmitting the rotation of one of said two pinions that constitute said pinion/rack mechanism to the rotation of a steering shaft of a right-hand wheel, and the rotation of the other of said two pinions to the rotation of a steering shaft of a left-hand wheel, respectively, so that said right-hand steering shaft is rotated in cooperation with said left-hand steering shaft; and a second connecting means connected so that the steering shafts of the right-hand front and rear wheels as well as the steering shafts of the left-hand front and rear wheels may be rotated in mutually reverse phases, respectively.

Thus, as the differential gear mechanism of the foregoing second aspect is replaced by the pinion/rack mechanism, degree of freedom in an installing position of the switching apparatus is enhanced. Further, as the steering operation thereof becomes a planar one, it matches the installing position of the switching apparatus well. Accordingly, the driving forms such as back and forth traveling, counter-clockwise turning, clockwise turning, turning on the spot, stopping and braking, etc, can be switched by a single-hand operation only.

The invention according to a fifth aspect of the invention is a driving form switching apparatus for switching driving forms of a four-wheel vehicle, including: a steering device including a steering lever and a pinion/rack mechanism having two pinions so that rotating motion or shifting motion of said steering lever may be transmitted to said pinion/rack mechanism; a first connecting means for transmitting the rotation of one of said two pinions that constitute said pinion/rack mechanism to the rotation of a steering shaft of a right-hand wheel, and the rotation of the other of said two pinions to the rotation of a steering shaft of a left-hand wheel so that said right-hand steering shaft is rotated in cooperation with said left-hand steering shaft; and a second connecting means connected so that the steering shafts of the right-hand front wheel and the left-hand rear wheel may be rotated in the same phase, and the steering shafts of the left-hand front wheel and the right-hand rear wheel may be rotated in the same phase.

Thus, as the differential gear mechanism of the foregoing third aspect is replaced by the pinion/rack mechanism, degree of freedom in an installing position of the switching apparatus is enhanced. Further, as the steering operation thereof becomes a planar one, it matches the installing position of the switching apparatus well. Accordingly, the driving forms such as back and forth traveling, leftward parallel traveling, rightward parallel traveling, turning on the spot, stopping and braking, etc, can be freely switched by a single-hand operation only.

The invention according to a sixth aspect of the invention is a driving form switching apparatus in which the device of the foregoing second aspect is combined with that of the third aspect so as to be able to switch between two systems. There is provided a change-over means for switching between the two systems so that the rotation of the two driven shafts that constitute the differential gear mechanism and allow the right- and left-hand steering shafts to be rotated cooperatively may be transmitted to one of the systems, said one system allowing the steering shafts of the right-hand front and rear wheels as well as those of the left-hand front and rear wheels may be rotated in mutually reverse phases, and the other system allowing the steering shafts of the right-hand front wheel and the left-hand rear wheel as well as those of the left-hand front wheel and the right-hand rear wheel may be rotated in the same phase, respectively.

When the rotation of the driven shafts that constitute the differential gear mechanism is transmitted to said one system by means of said change-over means, the driving forms such as back and forth traveling, counter-clockwise turning, clockwise turning, turning on the spot, stopping and braking, etc, can be switched by a single-hand operation only. When the rotation of the driven shafts is transmitted to the other system, the driving forms such as back and forth traveling, leftward parallel traveling, rightward parallel traveling, turning on the spot, stopping and braking, etc, can be freely switched by a single-hand operation only.

The invention according to a seventh aspect of the invention is a driving form switching apparatus for switching driving forms of a four-wheel vehicle in which the device of the foregoing fourth aspect is combined with that of the fifth aspect so as to be able to switch between two systems. There is provided a change-over means for switching between the two systems so that the rotation of the two pinions that constitute the pinion/rack mechanism and allow the right- and left-hand steering shafts to be rotated cooperatively may be transmitted to one of the systems, said one system allowing the steering shafts of the right-hand front and rear wheels as well as those of the left-hand front and rear wheels may be rotated in mutually reverse phases, and the other system allowing the steering shafts of the right-hand front wheel and the left-hand rear wheel as well as those of the left-hand front wheel and the right-hand rear wheel may be rotated in the same phase, respectively.

When the rotation of the driven shafts that constitute the pinion/rack mechanism is transmitted to said one system by means of said change-over means, the driving forms such as back and forth traveling, counter-clockwise turning, clockwise turning, turning on the spot, stopping and braking, etc, can be switched by a single-hand operation only. When the rotation is transmitted to the other system, the driving forms such as back and forth traveling, leftward parallel traveling, rightward parallel traveling, turning on the spot, stopping and braking, etc, can be freely switched by a single-hand operation only The invention according to an eighth aspect of the invention is a method of controlling the switching of driving forms of a four-wheel vehicle, said four wheels being axially independently provided, including right-hand front and rear wheels and left-hand front and rear wheels, each of said wheels having a steering shaft, enabling the switching of the driving forms by single-hand operation of a steering lever, having the steps of: selecting a driving form from the two of driving-into-the garage steering and driving-sideways-steering, then; transmitting rotating motion or shifting motion of said steering lever to at least one of said right-hand wheels and at least one of said left-hand wheels; and controlling so that rotation of the steering shafts to which said motion has been transmitted may be interlocked with the rotation of the steering shafts of said right- and left-hand front and rear wheels, respectively.

By controlling in the above-mentioned manner, one steering lever can be operated by a single hand, and the driving forms of a four-wheel vehicle such as back and forth traveling, counter-clockwise turning, clockwise turning, turning on the spot, parallel traveling, stopping and braking, etc, can be switched simply.

According to the present invention, the steering lever and the differential mechanism are coupled to each other, while the motion by the differential mechanism is interlocked with the steering shafts of the vehicle, thus enabling the rotation of the steering shafts of the four wheels to be controlled. As a result, the driving forms of a four-wheel vehicle such as back and forth traveling, counter-clockwise turning, clockwise turning, turning on the spot, parallel traveling, stopping and braking, etc, can be switched by a single-hand operation only.

DETAILED DESCRIPTION OF THE INVENTION

Next is a description of embodiments of the invention with reference to the attached drawings.

Figure 1:
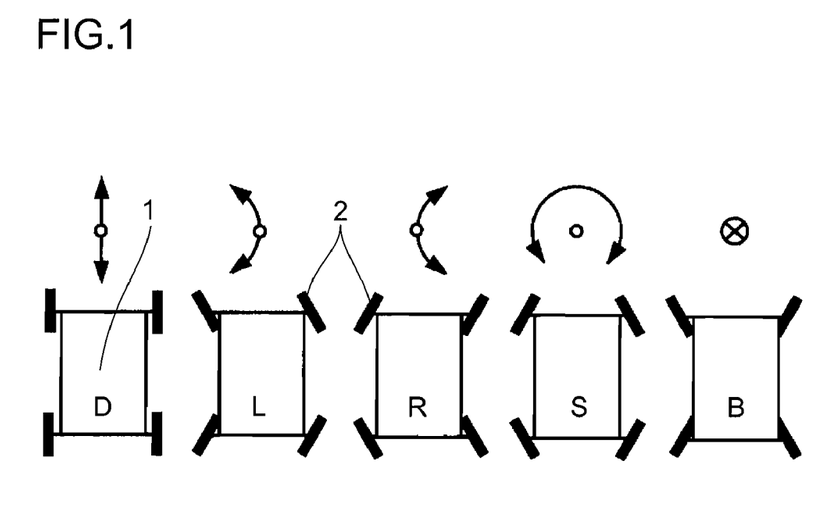
FIG. 1 is a schematic diagram showing a "driving-into-the-garage steering" mode of a four-wheel vehicle.
Figure 2:
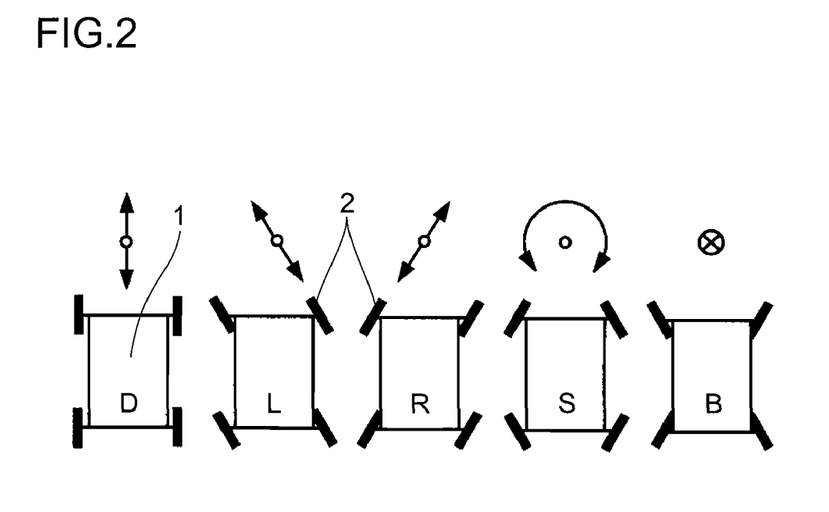
FIG. 2 is a schematic diagram showing a "driving-sideways steering" mode of a four-wheel vehicle.

FIG. 1 is a schematic diagram showing "driving-into-the-garage steering" driving form of a four-wheel vehicle 1, while FIG. 2 also is a schematic diagram showing "driving-sideways steering" driving form thereof. The driving forms of the "driving-into-the-garage steering", including stopping and braking, are classified as shown in FIG. 1, in terms of steering angle of the four-wheel 1. In the drawings, arrows indicate traveling directions, while alphabetical letters D, L, R, S and B mean a back and forth traveling (Direct), clockwise turning (Left turn), counter-clockwise turning (Right turn), turning on the spot (Spin) and stopping and braking (Brake), respectively. These driving forms are useful in improving steering performance, and thus they are advantageous when driving a vehicle into the garage etc.

On the other hand, when passing someone in a narrow corridor, for example, "driving-sideways steering" as parallel traveling without changing the direction of the four-wheel 1 is advantageous. The driving forms in that case are classified as shown in FIG. 2. According to this steering system, the direction of the four-wheel 1 is changed by the form S as turning on the spot. In the form B, all the wheels 2 of the four-wheel vehicle 1 are steered so as to be directed radially from the center of the four-wheel 1 to thereby restrain the movement thereof to stop the vehicle 1, utilizing a frictional force between the wheels 2 and a road surface. In this regard, the vehicle 1 of the invention differs from conventional vehicles.

The present invention is aimed at solving such technical problems that the five driving forms as illustrated in FIGS. 1 and 2 be switched by the single-hand operation of a steering lever, without using any actuator or electronic control circuit.

Figure 3:
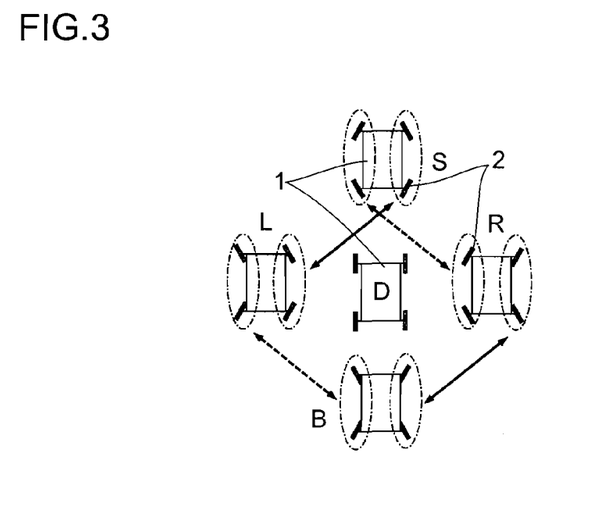
FIG. 3 is a schematic diagram illustrating how steering shafts in the "driving-into-the-garage steering" are coupled.
Figure 4A:
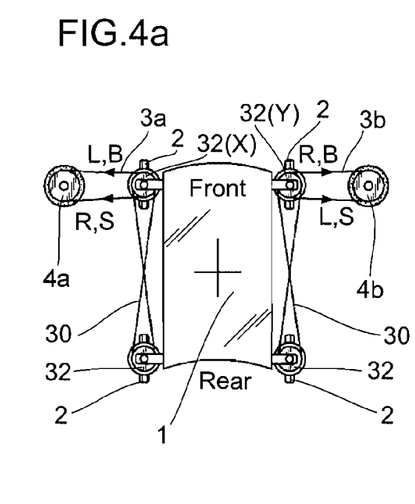
FIGS. 4(a) and 4(b) are schematic diagrams illustrating how driving shafts in the "driving-into-the-garage steering" are connected.
Figure 4B:
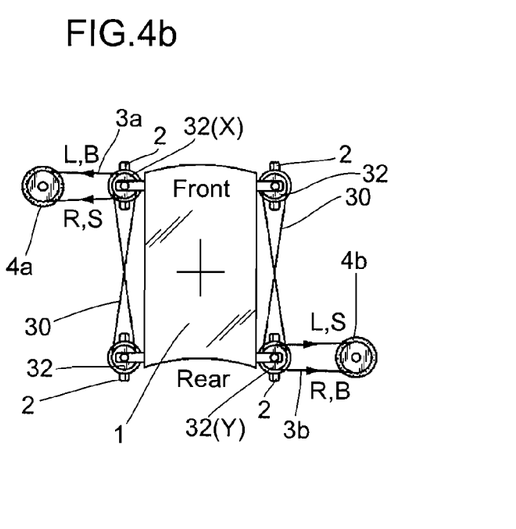

To achieve that, the inventor of the present invention focused on the rotation directions of the wheels 2, and incorporable steering shafts are bundled by a power transmission means such as a wire. FIG. 3 shows the driving forms shown in FIG. 1 that have undergone such bundling works. As is seen from the directions of the wheels 2, it can be confirmed that the steering shafts 32 of the wheels 2 located on a right-hand with respect to the back and forth driving form D are rotated in mutually opposite directions, and those located on a left-hand are also rotated in the same manner. It can be seen that the driving forms shown in FIG. 1 can be realized without any difficulty even in the case that the steering shafts 32 of the wheels 2 are cross-connected by a belt 30 or the like, as illustrated in FIGS. 4(a) and 4(b).

Figure 5:
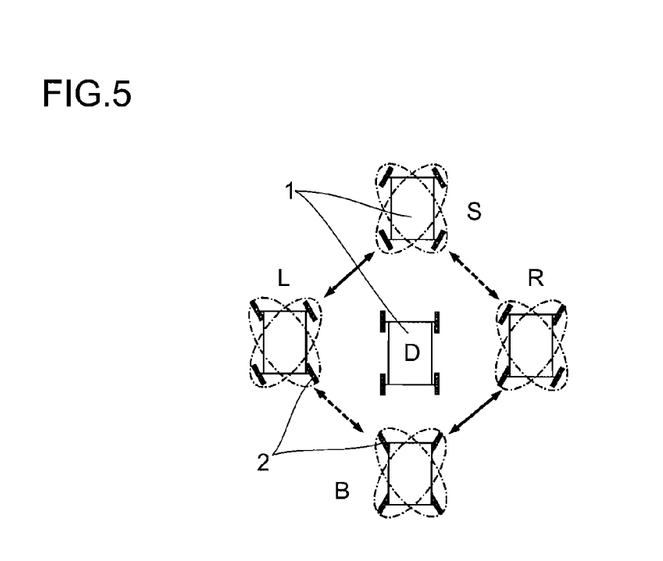
FIG. 5 is a schematic diagram illustrating how steering shafts in the "driving-sideways steering" are coupled.
Figure 6A:
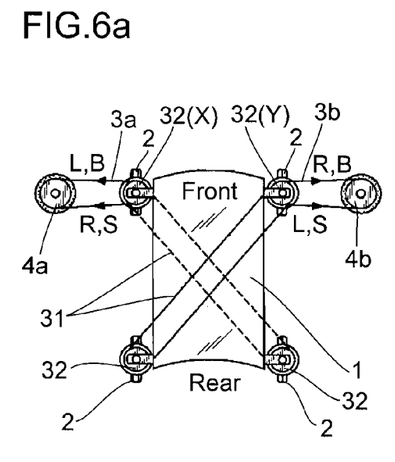
FIGS. 6(a) and 6(b) are schematic diagrams illustrating how driving shafts in the "driving-sideways steering" are connected.
Figure 6B:
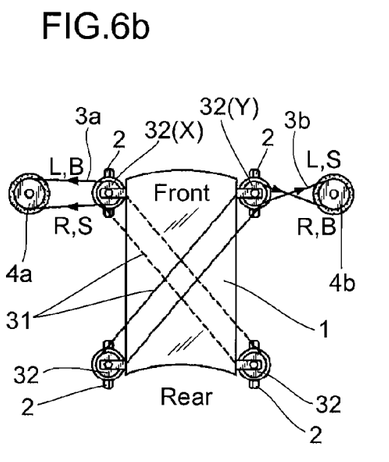

For the driving forms shown in FIG. 2, the wheels 2 are directed as illustrated in FIG. 5. As is seen from the illustrated directions of the wheels 2, it can be confirmed that the steering shafts 2 of the wheels 2 located diagonally oppositely with respect to the back and forth driving form D are rotated in the same direction. It can be seen therefrom that the driving forms shown in FIG. 2 can be realized without any difficulty even in the case that the steering shafts 32 of the wheels 2 are parallel-connected by a belt 31 or the like, as illustrated in FIGS. 6(a) and 6(b).

Further, it should be noted that once the steering shafts 32 are connected in the above-mentioned manner, a driving force required for realizing the above-mentioned five motion forms can be provided merely by controlling the swaying-like turning force to be applied to just the two steering shafts 32. In other words, all you have to do is just to control the swaying-like turning angles of the steering shafts 32(X), 32(Y) shown in FIGS. 4 and 6. These steering shafts 32(X), 32(Y), however, are unable to be controlled independently, and thus the direction of rotation is designated according to the respective driving forms D, L, R, S and B. That is, an innovative technique is needed.

According to the present invention, as shown in FIGS. 7 to 13, a driving shaft of a differential gear mechanism 5 is allowed to serve as a steering lever 7, while the rotation of two driven shafts 6a, 6b driven by the operation of the control lever 7 is used for driving the above-mentioned two steering shafts 32(X), 32(Y), thus utilizing them for cooperative action between them. On the other hand, between two parallel racks 19a, 19b are arranged the rod-like steering lever 7 so that the rotation of two pinions 18a, 18b rotating along the racks 19a, 19b may be used for driving the two steering shafts 32(X), 32(Y), thus utilizing the swaying-like rotation of the pinions 18a, 18b obtained by the operation of the steering lever 7 for cooperative action between the two steering shafts 32(X), 32(Y). In general, the pinions 18a, 18b are arranged a distance away from the steering shafts 32(X), 32(Y), and thus, the motion thereof can be transmitted to the steering shafts 32(X), 32(Y) by the flexible wires 3a, 3b passing through helical tubes.

Length to width ratio of the four-wheel 1 is approximately one for a walking support vehicle for use in supporting the walking of disabled persons, while it is more than one for the one for general purpose. For this reason, arrangement of the four wheels 2 represents a regular square pattern or an oblong rectangular pattern that is longer in back and forth direction. In that case, the steering shaft 32 for turning on the spot needs to be controlled at an angle of 45 degrees or above (see "S" in FIGS. 1 and 2). Further, the angle of the steering shaft 32 for braking and stopping needs to be larger than a direction angle at which the steering shaft 32 is viewed from the center of the four-wheel vehicle 1 (see "B" in FIGS. 1 and 2). The above-mentioned arrangement can be achieved by changing the teeth number ratio of the differential gear mechanism 5. In other words, angular range of the steering shaft 32 can be designed mechanically freely, without changing the upper and lower limits of angles for rotating or tilting the steering lever 7.

Accordingly, the best mode of the present invention is realized when the flexible wires 3a, 3b serving to connect the drums 4a, 4b connected with the driven shafts 6a, 6b with the two steering shafts 32(X), 32(Y) as well as the flexible wires 30, 31 serving as the cross-coupling or parallel-coupling means for interlinking the respective steering shafts 32 are allowed to transmit a driving force under predetermined tension without expansion or contraction. Alternatively, the flexible wires 3a, 3b, 30 and 31 serving as the cross or parallel-coupling means may be replaced by rotating shafts, timing belts, chains, links, gears or the like. In that case, the best mode is achieved when the mechanism is free from a play.

In order to effectively switch the five driving forms, it is desirable that the four wheels 2 should be grounded at all times. Accordingly, the vehicle is designed so that a certain level of torsion is allowable between the front and rear parts of the vehicle 1 as well as between the right and left part thereof. This, however, does not mean that each of the four wheels 2 has its own suspension function.

Figure 7:
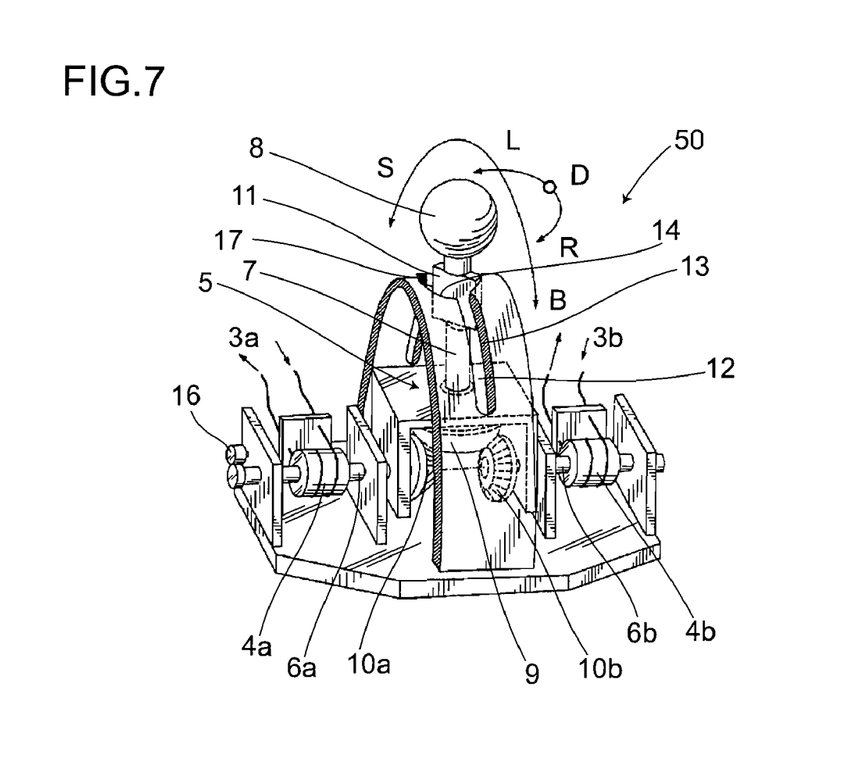
FIG. 7 is a perspective view showing a structure of a steering device in accordance with an embodiment of the present invention.

FIG. 7 is a perspective view showing the structure of a steering device 50 in accordance with an embodiment of the invention. In this embodiment, a main driving shaft of the differential gear mechanism 5 is constituted as the steering lever 7, having one end to be grasped and manipulated by a hand, and the other end directly connected with the main driving shaft gear 9. This main driving shaft gear 9 is allowed to mesh with two driven gears 10a, 10b. The steering lever 7 is capable of being freely brought down toward the far and near sides with the same being retained by a frame (not shown, for simplicity). It should be noted, however, that the steering lever 7 is slidable along a space defined by an elongated hole 12 only when a guide plate 11 fixed below the grip 8 is aligned with a direction in which the elongated hole 12 extends. The rotating operation of the grip 8 is blocked mechanically while the steering lever 7 is being brought down.

On the other hand, a circular hole 14 is provided in the center of a top portion of a wall 13 of the elongated hole 12 guiding the steering lever 7. The circular hole 14 has a diameter slightly larger than the width of the guide plate 11 so that the steering lever 7 is free to rotate therein. The rotation of the steering lever 7 is limited to ±90 degrees or less by a stopper 17 inside the circular hole 14. Further, the stopper 11 allows the guide plate 11 to be always kept in the same direction within the elongated hole 12. When the steering lever 7 is brought down toward one side with the mechanism being thus structured, the two driven gears 10a, 10b allow the drums 4a, 4b directly connected therewith to rotate in the same direction by the same degree. When the steering lever 7 is brought down toward the reverse direction, the gears 10a, 10b allow the drums 4a, 4b to rotate in the reverse direction.

When a turning force toward one direction is applied to the grip 8 of the steering lever 7 within the circular hole 14, the drums 4a, 4b are allowed to rotate reversely with respect to each other. When a turning force toward the reverse direction is applied thereto, the drums 4a, 4b are allowed to rotate reversely with respect to the previous rotational direction, respectively.

The two drums 4a, 4b are allowed to transmit the motion of the steering shafts 7 to the steering shafts 32(X), 32(Y) shown in FIGS. 4 and 6, via the flexible wires 3a, 3b guided by helical tubes (not shown) since the wires 3a, 3b are wound around the drums 4a, 4b. It should be noted, however, that how to couple the flexible wires 3a, 3b depends upon the way how the motion for tilting the steering lever 7 and the motion for turning the grip 8 thereof. In other words, by merely changing the coupling manner of the flexible wires 3a, 3b transmitting the rotation of the two drums 4a, 4b to the two steering shafts 32(X), 32(Y), the steering shaft tilting motion can be used for switching between the forms L and R, while the grip turning motion can be used for switching between the forms S and B in FIGS. 1, 2. Also, the steering shaft tilting motion can be used for switching between the forms S and B, while the grip turning motion can be used for switching between the forms L and R. No additional devices required for those purposes are necessary.

More specifically, when the two steering shafts 32(X), 32(Y) shown in FIGS. 4(a) and 6(a) are driven by the two drums 4a, 4b in the first embodiment illustrated in FIG. 7, either L or R can be selected by the steering shaft tilting motion, while either S or B can be selected by the grip turning motion. On the other hand, when the two steering shafts 32(X), 32(Y) shown in FIGS. 4(b) and 6(b) are driven, respectively, the switching of driving forms by the steering operation is inversed, such that either S or B can be selected by the steering shaft tilting motion, while either L or R can be selected by the grip turning motion. In any coupling manner, the driving form D is selected by placing the grip 8 on the top to reduce the turning amount to zero.

In order not only to keep the selected driving form unchanged, but also to retain the turning amount of the grip 8 and the tilting angle of the steering lever 7 at desired magnitudes, the frictional force between the guide plate 11 and the elongated hole 12 or the circular hole 14 can be utilized. Alternatively, an elastic member such as spring or rubber may be used to set tightness or looseness in the steering operation at an appropriate value.

The turning amount of the grip 8 as well as the tilting angle of the steering lever 7 can be displayed visually on an angle indicator or a position mark provided on the grip 8. Numerical display may be provided by engaging one of the driven shafts 6a, 6b with an angle sensor such as a potentiometer to thereby use signals obtained for numerical display. In the meantime, a rotational angle sensor 16 shown in FIG. 7 is incorporated for such display.

Figure 8:
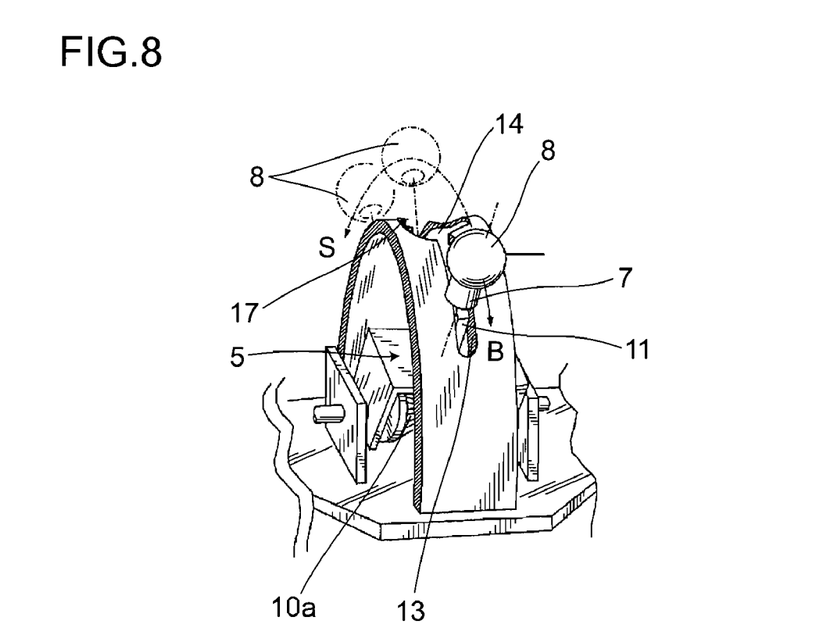
FIG. 8 is another perspective view showing the structure of the steering device in accordance with the embodiment of the present invention.
Figure 9:
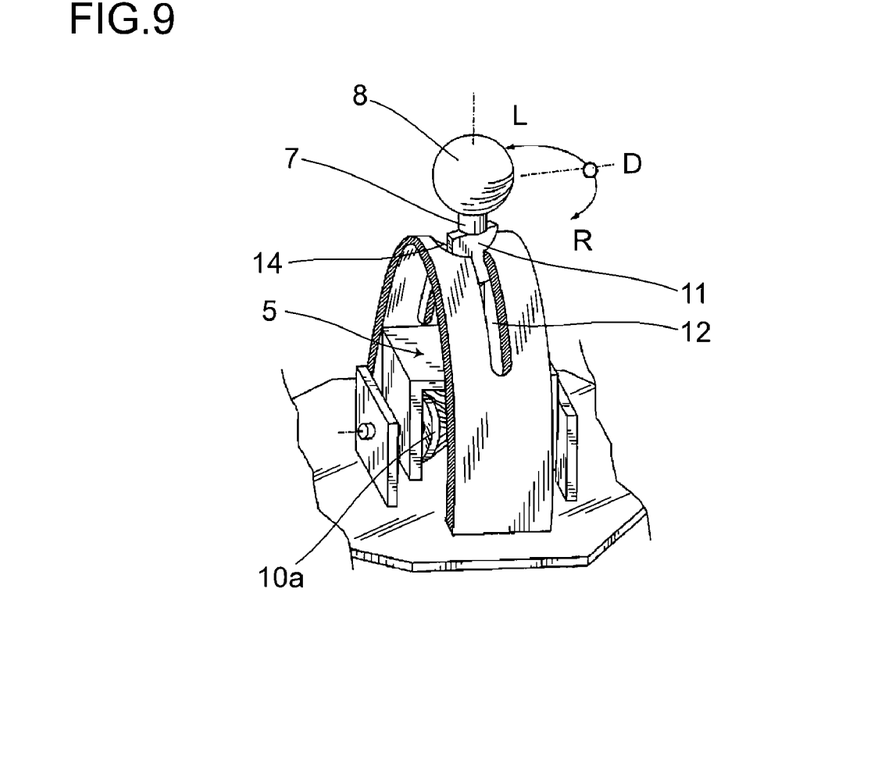
FIG. 9 is a further perspective view showing the structure of the steering device in accordance with the embodiment of the present invention.

FIGS. 8 and 9 are schematic diagrams illustrating the steering lever 7 that is tilted or turned, respectively. Whilst the upper and lower limits of the tilting angle of the steering lever 7 is given mechanically by the length of the elongated hole 12, the turning angle can be set by fixing the stopper 17 (not shown) to one of the two driven shafts 6a, 6b. In that case, the upper and lower limits of the grip 8 can be set simultaneously. Alternatively, the upper and lower limits of the turning angle may be set by arranging the stopper 17 on one side of the interior of the circular hole 14. This plays a role in allowing the guide plate 11 to always move in the same direction within the elongated hole 12.

The trajectory of the hand motion required for the operation of the steering shaft discussed in the above embodiment is arc one. In some cases, however, it is more effective if the hand motion is linear, depending on an individual user or an installed condition. For example, a user can exert his/her strength by linear hand motion more easily than by arc hand motion, depending on which part of his/her arm muscles are damaged. Needless to say, there are actually certain number of users who find it easier to exert their strength by arc hand motion. Accordingly, it is preferable that users can select their own suitable hand motion.

Figure 10:
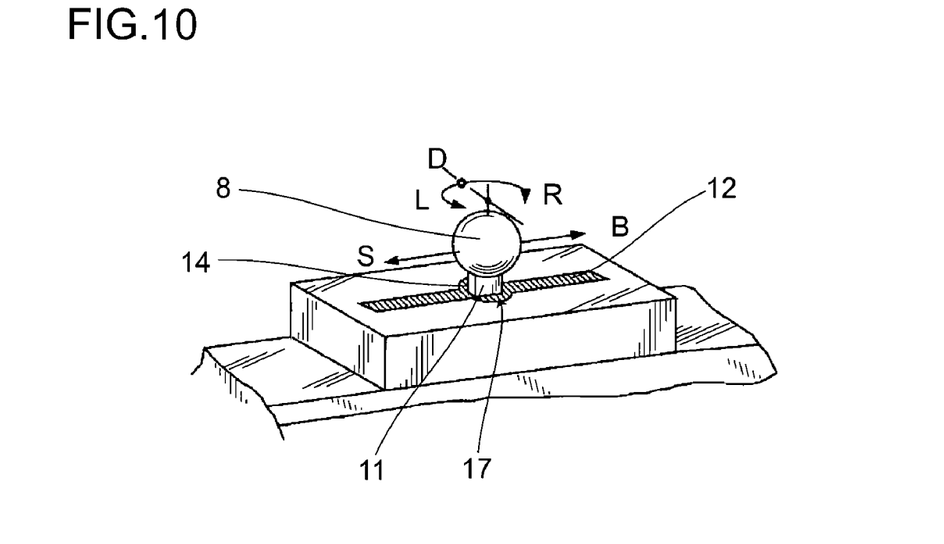
FIG. 10 is a perspective overview showing a steering device in accordance with another embodiment of the present invention.
Figure 11:
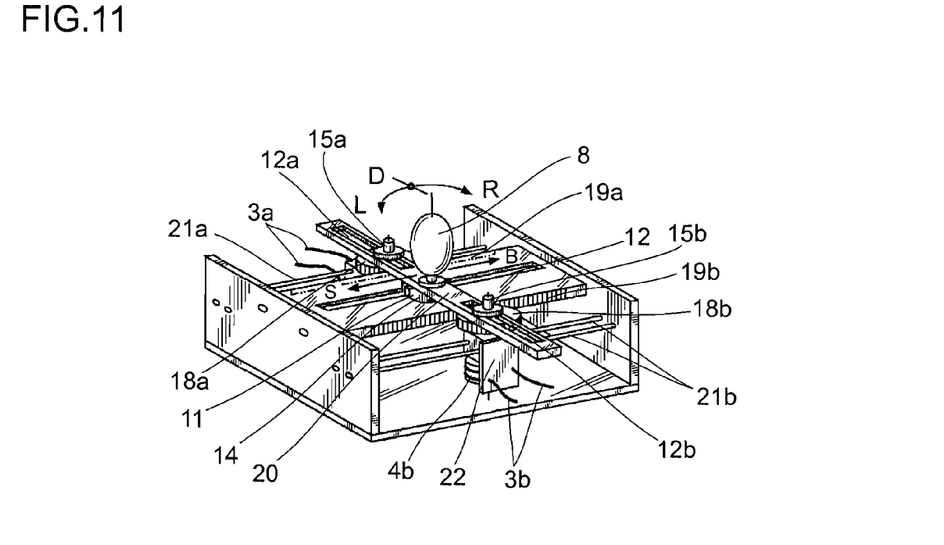
FIG. 11 is another perspective overview showing the steering device in accordance with the embodiment of FIG. 10 of the present invention.
Figure 12:
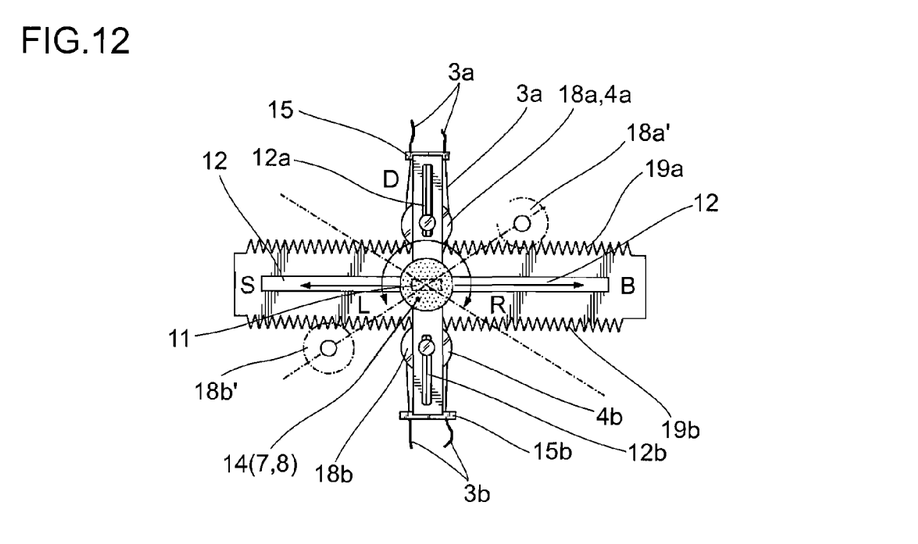
FIG. 12 is a plan overview showing a steering device in accordance with the embodiment of FIG. 10 of the present invention.
Figure 13:
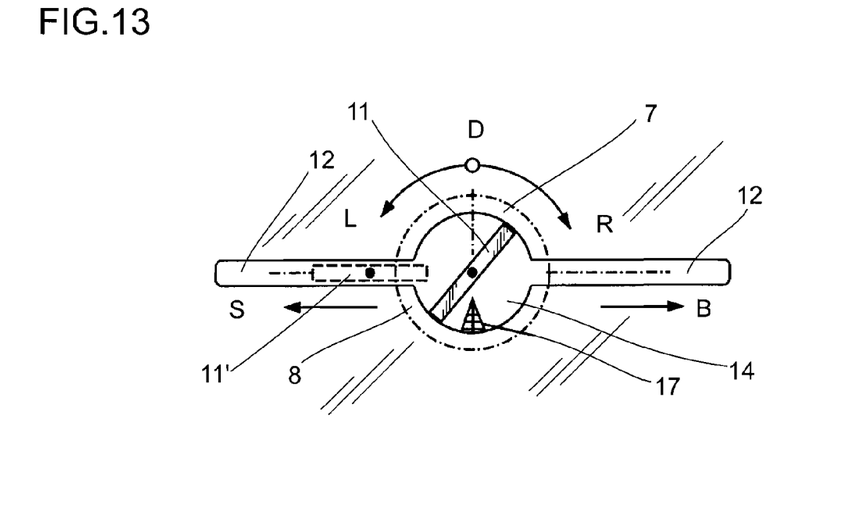
FIG. 13 is another plan overview showing the steering device in accordance with the embodiment of FIG. 10 of the present invention.

FIG. 10 is a schematic view of another embodiment of the present invention, while FIGS. 11 and 12 are perspective and plan views, illustrating the structures thereof, respectively. Illustrated is a device useful in transforming a hand motion into a linear motion. Like in the previous embodiment, the aforesaid five driving forms of the four-wheel vehicle 1 can be switched. Instead of the differential gear mechanism, two sets of the pinions 18a, 18b and the racks 19a, 19b are used to input the turning or shifting motion of the steering lever 7, while the flexible wires 3a, 3b wound around the drums 4a, 4b directly connected with the pinions 15a, 15b are used to control the steering angle of the steering shafts 32.

An arm 20 is fixed perpendicularly to the steering lever 7 having the grip 8 attached thereto, while the guide plate 11 is fixedly provided therebelow. The steering lever 7 is shifted in such a manner that the guide plate 11 traces a path defined by the elongated hole 12 parallel to the racks 19a, 19b enabling the smoothed motion along a linear line. Further, in order to retain the arm 20 at a predetermined height, the shafts of the pinions 18a, 18b are inserted through elongated holes 12a, 12b provided on the arm 20. It should be noted, however, that the pinions 18a, 18b are freely slidable on two mutually parallel rails 21a, 21b, using a linear bush or the like so that the pinions 18a, 18b may always engage with the racks 19a, 19b. Like in the first embodiment, the elongated hole 12 includes in the center thereof the circular hole 14 for turning the steering lever.

With the structure thus made, the grip 8 is only allowed to turn when the steering lever 7 is in the circular hole 14. At that moment, the arm 20 is rotated in the same manner, so that the two pinions 18a, 18b, rotating in the same direction, are allowed to settle in the same distance away from the center of the circular hole 14. Since the shafts of the two pinions 18a, 18b are supported by the rails 21a, 21b, and guided by the elongated holes 12a, 12b, respectively, they are capable of being swayed freely in the forward and reverse directions, in response to the turning motion of the grip 8. Further, when the direction of the guide plate 11 is aligned with that of the elongated hole 12, the grip 8 is allowed to move linearly. At that moment, the arm 20 is arranged always perpendicularly relative to the racks 19a, 19b without rotating. The pinions 18a, 18b are rotated in mutually reverse directions, with the same kept equidistant from the center of the circular hole 14. These motions are clearly understood from an explanatory plan view of FIG. 12.

The steering lever 7 is turned or shifted in a swaying-like manner, within a limited region area. Like in the first embodiment, the direction of the guide plate 11 moved within the elongated hole 12 is unchanged. It can be easily understood that such unchanged condition is realized by the stopper 11 such as a protrusion provided inside the circular hole 14 (see FIG. 13). It is also obvious that the general structure of the device thus constructed is as illustrated in FIG. 10.

In the device configuration of the second embodiment shown in FIG. 11, the pinions 18a, 18b have the drums 4a, 4b fixed coaxially therewith, and thus they are rotated in the same direction when turning the steering lever 7, while in the mutually reverse directions when shifting the same. Further, the flexible wires 3a, 3b wound around the drums 4a, 4b are guided into the helical tube via buckles 15a, 15b fixed to the arm 20 so that they are connected with the two steering shafts 32(X), 32(Y) that drive the wheels 2, like in the above embodiment. Accordingly, the turning motion of the grip 8 can be associated with any of the forms L and R, or the forms S and B, depending upon to which of the two steering shafts 32(X), 32(Y) and in what direction the flexible wires 3a, 3b wound around the drums 4a, 4b are to be connected. In short, the configuration of the device of the second embodiment can be changed both for switching between the five driving forms shown in FIG. 1 and for switching between those shown in FIG. 2. Like in the above embodiment, no additional mechanical elements are required therefor.

In the case that a material such as a rubber sheet is placed between the elongated hole 12 and the circular hole 14, a frictional force occurring between a steering lever guiding wall 13 and the guide plate 11 can be utilized for retaining the rotational angle or position of the grip 8, when the guide plate 11 is rotated or shifted. Also, such retaining capability can be set at an appropriate value by changing the kind, thickness and/or fixing manner of the material, like in the above embodiment. Like in the above embodiment, one of the pinions 18a, 18b may be engaged with an angle sensor (not shown) to thereby use signals thus obtained for numerical display of the rotational angle or displacement of the steering lever 7, i.e., steering angle thereof. It can be readily understood that those skilled in the art have no difficulty in replacing the flexible wires 3a, 3b by rotating shafts, timing belts, chains, links, gears or the like.

For R and L of the foregoing five driving forms, position and angle designated by the steering lever 7 should be of continuous quantity, while for switching between S and B, designated quantities thereof should preferably be on/off-like appropriate values. Such values are determined by length to width ratio of the four-wheel 1 and arrangement of the wheels. Accordingly, the device is preferably designed so that in selecting the driving form S or B, such appropriate values may be satisfied when the steering lever 7 reaches upper or lower limits of the operating range. In that case, carrying the steering lever 7 to the upper or lower limits at once will be a skillful manual operation thereof. As a result, maximum steering angle of the driving forms L and R become unable to be designated in such an at-once manner, which, however, does not cause any problem since the length-to-width ratio of the wheel arrangement generally does not extremely deviate from one.

The driving form B adopted by the present invention does not require any particular force to restrain the rotation of the wheels 2, and thus all the power supplied can be utilized for the turning of the wheels 2. For this reason, it has an advantage that energy use efficiency of the four-wheel 1 can be enhanced.

As discussed in detail as above, the present invention provides a method for controlling the turning angles of the steering shafts 32 of the four-wheel vehicle 1 in a manner cooperating with one another, to thereby freely switch the driving forms essentially consisting of: back and forth traveling, counter-clockwise turning, clockwise turning, turning on the spot, parallel travelling, stopping and braking, by a single-hand operation of the steering lever 7. Specifically, the differential gear mechanism 5 or pinion/rack mechanisms 18, 19 are used so that the turning motion around the axis of the steering lever 7, tilting motion or parallel-shifting motion thereof are transmitted to the aforesaid two steering shafts 32(X), 32(Y) by the two rotation shafts 6a, 6b and 15a, 15b as well as the flexible wires 3a, 3b wound around the drums 4a, 4b connected with these rotation shafts. Thus, those motions are transmitted to the steering shaft 32(Y) having the right-hand wheel steering shaft cross-connected therewith and the steering shaft 32(X) having the left-hand wheel steering shaft cross-connected therewith, or otherwise, to the steering shaft 32(X) having the diagonally-opposite wheel steering shaft parallel-connected therewith and the steering shaft 32(Y) having the diagonally-opposite steering shaft parallel-connected therewith, respectively, thus providing the device enabling easy switching of the above driving forms by a single-hand operation.

Figure 14:
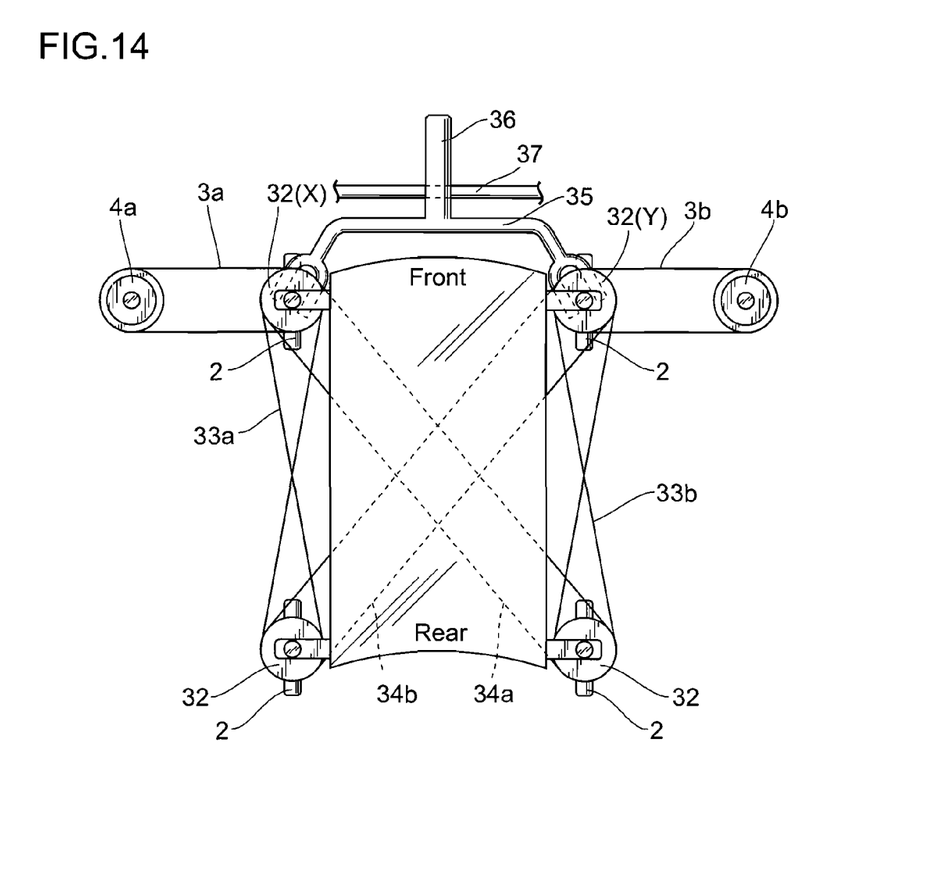
FIG. 14 is a schematic diagram showing how steering shafts are coupled in accordance with a further embodiment of the present invention.

FIG. 14 shows a further embodiment of the invention which enables simple single-hand switching of "driving-into-the-garage steering" illustrated in FIG. 1 and "driving-sideways steering" illustrated in FIG. 2. According to the present embodiment, the rotation of the drums 4a, 4b connected with the output shafts of the differential mechanism such as the differential gear mechanism of the one embodiment or the pinion/rack mechanism of the other embodiment, is transmitted so as to rotate the steering shafts 32(X), 32(Y) of the wheels via the flexible wires 3a, 3b. The left-hand front and rear steering wheels 32(X) and 32, as well as the right-hand front and rear steering wheels 32(Y) and 32, are each cross-connected by flexible wires 33a, 33b, respectively. Accordingly, the front and rear wheels on either side are steered in mutually opposite phases, respectively. At the same time, the left-hand front steering wheel 32(X) is parallel-connected with the right-hand rear wheel 32 by the flexible wire 34a, while the right-hand front steering wheel 32(Y) is parallel-connected with the left-hand rear wheel 32 by the flexible wire 34b. Accordingly, the left-hand front wheel and the right-hand rear wheel as well as the right-hand front wheel and the left-hand rear wheel are steered in mutually the same phases, respectively. In the meantime, although the two steering shafts 32(X), 32(Y) connected with the drums 4a, 4b via the flexible wires 3a, 3b are those of front wheels, the same effect can be achieved if they are those of rear wheels.

When transmitting the rotation of the drums 4a, 4b to the steering shafts 32(X), 32(Y), users can select between a first system cross-connected by the flexible wires 33a, 33b and a second system parallel-connected by the flexible wires 34a, 34b, and then the systems can be switched using an arm 35. The arm 35 is driven up and down by operating a lever 36 rotating about a fixed shaft 37 so that it acts on a change-over device provided on the steering shafts 32(X), 32(Y).

Figure 15:
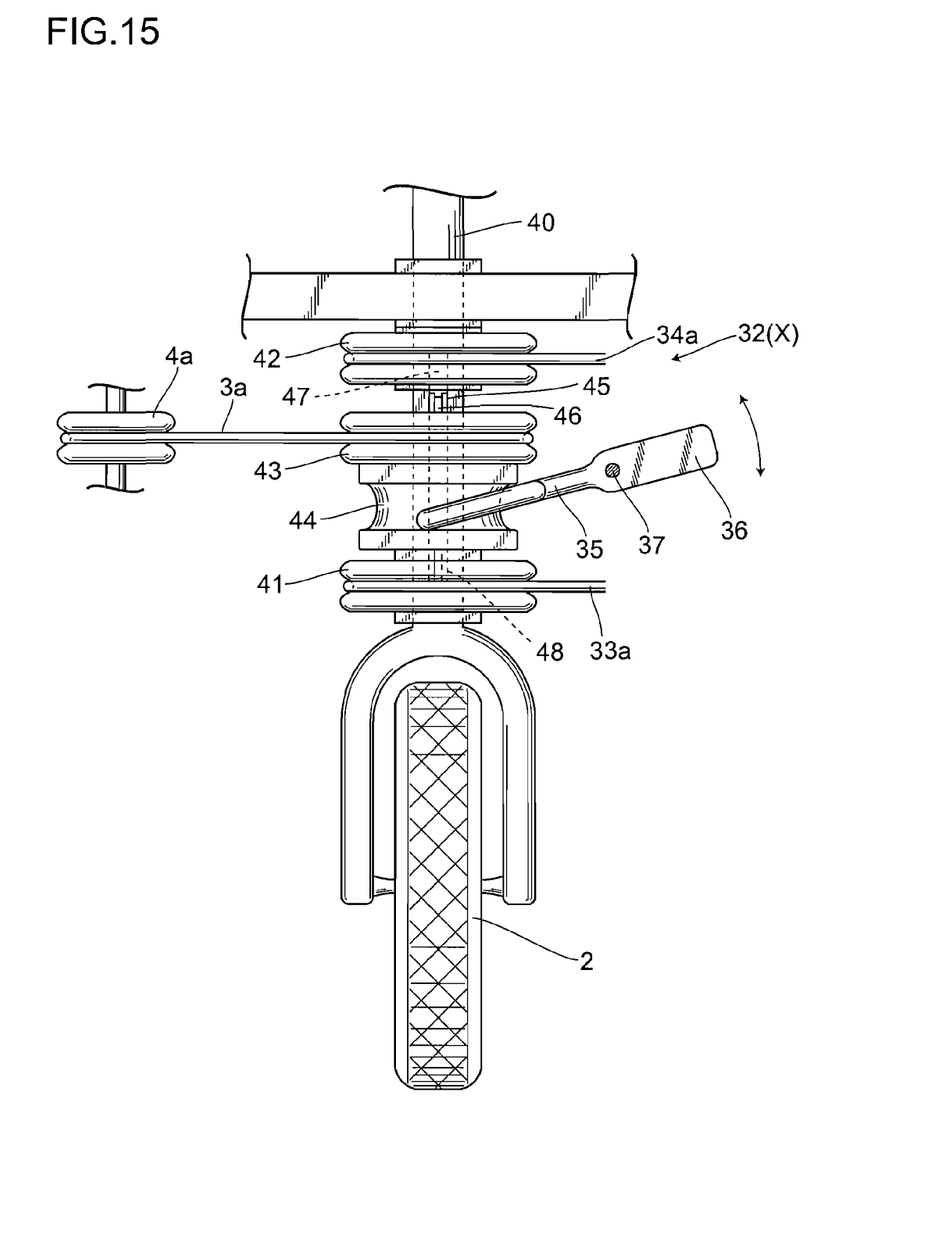
FIG. 15 is a schematic diagram showing the structure of the steering shafts in accordance with the embodiment of FIG. 14 of the present invention.

Next is an explanation of the change-over device with reference to FIG. 15. Since the left steering shaft 32(X) and the right steering shaft 32(Y) behave in the same manner, explanation will be made, taking the steering shaft 32(X) as an example.

To an axle 40 are rotatably attached transmission drums 41, 42. The transmission drum 41 is cross-connected with the left-hand rear steering shaft 32 by the flexible wire 33a so that the left-hand front and rear wheels are steered in the opposite phases. The transmission drum 42 is parallel-connected with the right-hand rear steering shaft 32 by the flexible wire 34a so that it is steered in the same phase as the right-hand rear wheel.

The transmission drum 43 is integrated with a linear bush 44 so that it may slide vertically along the axle 40. The axle 40 has a groove 45 while a key 46 is attached to the transmission drum 43 and the linear bush 44, said key 46 being fitted into said groove 45 and sliding therein. The transmission drum 43 is connected with the drum 4a by the flexible wire 3a. The transmission drums 41, 42 are provided with pits 47, 48, respectively in order for the key 46 to fit therein.

Next is a description of the action of the above-mentioned change-over device. When the lever 36 is tilted upward, the arm 35 pushes the linear bush 44 downward, so that the key 46 sliding in the groove 45 is allowed to engage with the pit 48 of the transmission drum 41. On the other hand, engagement of the pit 47 of the transmission drum 42 with the key 46 is released. When the steering lever 7 is operated and thus the drum 4a is rotated under that condition, the transmission drum 43 connected with the flexible wire 3a is rotated. The axle 40 is rotated by this rotation, thus steering the wheels 2. Since the key 46 is engaged with the pit 48 of the transmission drum 41, the transmission drum 41 is allowed to rotate simultaneously, and the rear wheel connected with the flexible wire 33a is also steered in the opposite phase. Since engagement of the pit 47 with the key 46 is released, the transmission drum 42 spins free.

On the other hand, when the lever 36 is tilted downward, the arm 35 pushes the linear bush 44 upward, so that the key 46 sliding in the groove 45 is allowed to engage with the pit 47 of the transmission drum 42. On the other hand, engagement of the pit 48 of the transmission drum 41 with the key 46 is released. When the steering lever 7 is operated and thus the drum 4a is rotated under that condition, the transmission drum 43 connected with the flexible wire 3a is rotated. The axle 40 is rotated by this rotation, thus steering the wheels 2. Since the key 46 is engaged with the pit 47 of the transmission drum 42, the transmission drum 42 is allowed to rotate simultaneously, and the right-hand rear wheel connected with the flexible wire 34a is also steered in the same phase. Since engagement of the pit 48 with the key 46 is released, the transmission drum 41 spins free.

Switching the driving forms by tilting the lever 36 upward or downward in this way enables the switching of the two single-hand control modes of the steering lever: the "driving-into-the-garage steering" mode essentially consisting of the following five driving forms: back and forth traveling, counter-clockwise turning, clockwise turning, turning on the spot, and stopping; and the "driving-sideways steering" mode essentially consisting of the following five driving forms: back and forth traveling, rightward parallel traveling, leftward parallel traveling, turning on the spot, and braking and stopping.

The change-over device of the present invention is not limited to the one described in the foregoing embodiment, but it can be also realized if a one-input-two-output gear system such as planetary gear or differential gear is used, instead. Needless to day, the rotating force of the drum may be transmitted utilizing a frictional force of a disc clutch or the like in place of the key and pit in the linear bush system. Further, steering that satisfies the Ackermann Geometry may be realized by steering the steering shaft of the wheels 2 by replacing the drums 4a,4b with mechanical elements such as an elliptic gear and drum, or a gear and drum whose perimeters are circular and elliptic, to thereby transmit the angular displacement of the rotation shaft as a shifting displacement, and at the same time by replacing the drums on the steering shaft side in the same manner. In short, since the angular displacement of the drums 4a,4b occurs in a swaying-like manner, the steering can be improved by non-linear control of the wire displacement relative to angle without causing tension or loosening of the wire.

Alternatively, all the drums and flexible wires may be removed from the differential gear mechanism, and the rotational angle sensor 16 may be engaged with the right and left driven shafts as shown in FIG. 7 so that the signals from the sensors are processed to drive a steering actuator to thereby use the change-over device as a steering lever for controlling the drive of an electric vehicle transforming manual power into an electric power.

Although the present invention was explained with reference to the foregoing embodiments, it should not be construed as limiting, but partial modification and/or replacement is possible within the gist and sprit of the invention.

It is possible to provide a technique enabling reliable switching of the driving forms of the four wheel vehicle 1 merely by single-hand input operation, eliminating the need for any electronic circuit or actuator for steering or controlling purpose. Accordingly, it is possible to control a manual steering device for a walking support vehicle assisting the walking of disabled persons or an electric wheelchair or the like. Thus, the present invention can make contribution to reduction of vehicle prices, improvement of reliability and convenience of steering control, and improvement of kinetic energy use efficiency, eventually making a contribution to the vehicular industry.

The invention claimed is:

1. A driving form switching apparatus for switching driving forms of a four-wheel vehicle, comprising:
   a steering device having a steering lever connected with a driving shaft of a differential gear mechanism so that rotating motion or swaying motion of said steering lever may be transmitted to two driven shafts;
   a first connecting means for transmitting the rotation of one of said two driven shafts that constitute said differential gear mechanism to the rotation of a steering shaft of a right-hand wheel, and the rotation of the other of said two driven shafts to the rotation of a steering shaft of a left-hand wheel so that said right-hand steering shaft is rotated in cooperation with said left-hand steering shaft; and
   a second connecting means connected so that the steering shafts of the right-hand front and rear wheels as well as the steering shafts of the left-hand front and rear wheels may be rotated in mutually reverse phases, respectively.

2. A driving form switching apparatus for switching driving forms of a four-wheel vehicle, comprising:
   a steering device having a steering lever connected with a driving shaft of a differential gear mechanism so that rotating motion or swaying motion of said steering lever may be transmitted to two driven shafts;
   a first connecting means for transmitting the rotation of one of said two driven shafts that constitute said differential gear mechanism to the rotation of a steering shaft of a right-hand wheel, and the rotation of the other of said two driven shafts to the rotation of a steering shaft of a left-hand wheel so that said right-hand steering shaft is rotated in cooperation with said left-hand steering shaft; and
   a second connecting means connected so that the steering shafts of the right-hand front wheel and the left-hand rear wheel may be rotated in the same phase, and the steering shafts of the left-hand front wheel and the right-hand rear wheel may be rotated in the same phase.

3. A driving form switching apparatus for switching driving forms of a four-wheel vehicle, comprising:
   a steering device including a steering lever and a pinion/rack mechanism having two pinions so that rotating motion or shifting motion of said steering lever may be transmitted to said pinion/rack mechanism;
   a first connecting means for transmitting the rotation of one of said two pinions that constitute said pinion/rack mechanism to the rotation of a steering shaft of a right-hand wheel, and the rotation of the other of said two pinions to the rotation of a steering shaft of a left-hand wheel so that said right-hand steering shaft is rotated in cooperation with said left-hand steering shaft; and
   a second connecting means connected so that the steering shafts of the right-hand front and rear wheels as well as the steering shafts of the left-hand front and rear wheels may be rotated in mutually reverse phases, respectively.

4. A driving form switching apparatus for switching driving forms of a four-wheel vehicle, comprising:

a steering device including a steering lever and a pinion/rack mechanism having two pinions so that rotating motion or shifting motion of said steering lever may be transmitted to said pinion/rack mechanism;

a first connecting means for transmitting the rotation of one of said two pinions that constitute said pinion/rack mechanism to the rotation of a steering shaft of a right-hand wheel, and the rotation of the other of said two pinions to the rotation of a steering shaft of a left-hand wheel so that said right-hand steering shaft is rotated in cooperation with said left-hand steering shaft; and a second connecting means connected so that the steering shafts of the right-hand front wheel and the left-hand rear wheel may be rotated in the same phase, and the steering shafts of the left-hand front wheel and the right-hand rear wheel may be rotated in the same phase.

5. A driving form switching apparatus for switching driving forms of a four-wheel vehicle, comprising:

a steering device having a steering lever connected with a driving shaft of a differential gear mechanism so that rotating motion or swaying motion of said steering lever may be transmitted to two driven shafts;

a first connecting means for transmitting the rotation of one of said two driven shafts that constitute said differential gear mechanism to the rotation of a steering shaft of a right-hand wheel, and the rotation of the other of said two driven shafts to the rotation of a steering shaft of a left-hand wheel so that said right-hand steering shaft is rotated in cooperation with said left-hand steering shaft;

a first system connected so that the steering shafts of the right-hand front wheel and the left-hand rear wheel may be rotated in the same phase, and the steering shafts of the left-hand front wheel and the right-hand rear wheel may be rotated in the same phase;

a second system connected so that the steering shafts of the right-hand front and rear wheels as well as the steering shafts of the left-hand front and rear wheels may be rotated in mutually reverse phases, respectively; and a change-over means for switching between said first and second systems so that output from said steering device may be transmitted to the system thus selected.

6. A driving form switching apparatus for switching driving forms of a four-wheel vehicle, comprising:

a steering device including a steering lever and a pinion/rack mechanism having two pinions so that rotating motion or shifting motion of said steering lever may be transmitted to said pinion/rack mechanism;

a first connecting means for transmitting the rotation of one of said two pinions that constitute said pinion/rack mechanism to the rotation of a steering shaft of a right-hand wheel, and the rotation of the other of said two pinions to the rotation of a steering shaft of a left-hand wheel so that said right-hand steering shaft is rotated in cooperation with said left-hand steering shaft;

a first system connected so that the steering shafts of the right-hand front and rear wheels as well as the steering shafts of the left-hand front and rear wheels may be rotated in mutually reverse phases, respectively;

a second system connected so that the steering shafts of the right-hand front wheel and the left-hand rear wheel may be rotated in the same phase, and the steering shafts of the left-hand front wheel and the right-hand rear wheel may be rotated in the same phase; and a change-over means for switching between said first and second systems so that output from said steering device may be transmitted to the system thus selected.

* * * * *